United States Patent Office 2,998,619
Patented Sept. 5, 1961

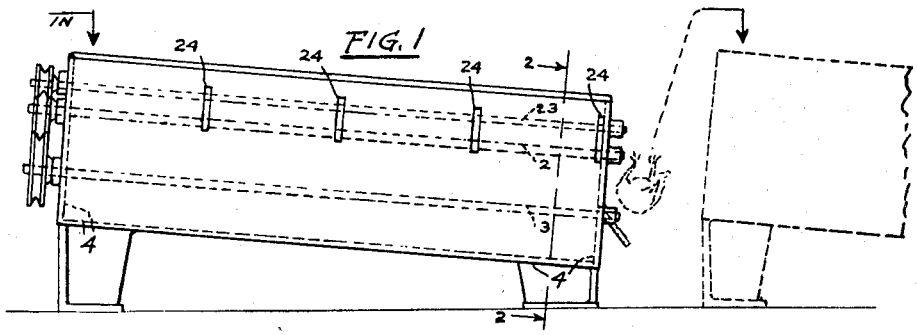
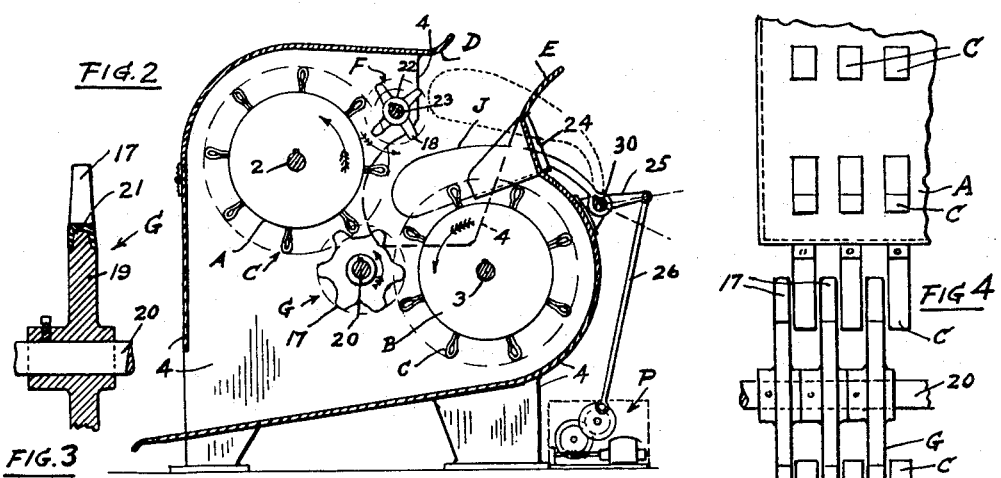
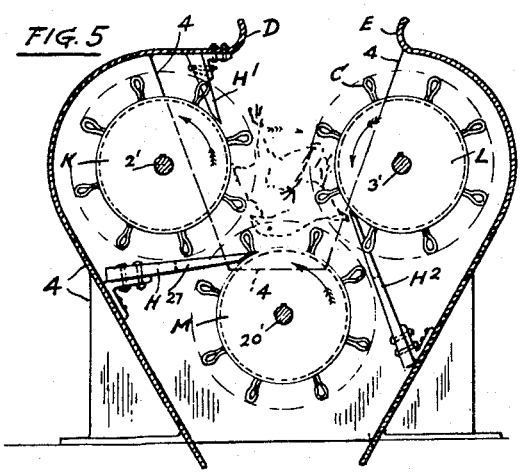
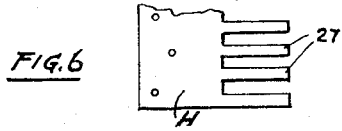

2,998,619
FOWL PICKING METHOD
Andrew J. Toti, Modesto, Calif., assignor to Honolulu Oil Corporation, a corporation of Delaware
Original application May 22, 1953, Ser. No. 356,654, now Patent No. 2,910,722, dated Nov. 3, 1959. Divided and this application Mar. 31, 1959, Ser. No. 803,126
4 Claims. (Cl. 17—45)

This is a division of my copending application Serial No. 356,654, filed May 22, 1953, now Patent No. 2,910,722.

This invention relates to the defeathering of fowl and particularly to a novel fowl picker and method wherein the fowl are supported by or ride freely upon and are tumbled about upon the fast-moving picking elements, and kept tumbling in every direction rapidly so as to expose every part of the fowl to the frictional striking and rubbing action of the picking elements.

The principal object of the invention is to provide a practicable method for picking the feathers from fowl, involving the above principle or method, and apparatus for carrying it out.

Another object is to provide a method and apparatus of this kind which will entirely do away with the suspension of the fowl or the supporting of the fowl on traveling conveyors during the picking operation, and which will result in more completely picked fowl than heretofore mechanically produced, and avoid the use of hand finishing.

Other objects and advantages of the invention will appear in the following description.

The accompanying drawings illustrate some of the various forms of apparatus by which the novel method may be successfully carried out.

In the drawings:

FIGURE 1 is a general view in side elevation of a fowl picker embodying the details of FIGURE 2;

FIGURE 2 is an enlarged cross section of FIGURE 1 taken along the line 2—2 thereof showing the arrangement of the revolving drum-like members upon which the picking and stripping elements are mounted or carried;

FIGURE 3 is an enlarged cross section of the lower rotary stripper of FIGURE 2;

FIGURE 4 is an enlarged development view showing the operative relation of the lower stripper elements to the drums and their picking elements;

FIGURE 5 is a cross section of a machine similar to that of FIGURE 2 but shown with stationary comb-like strippers instead of the rotary strippers of FIGURE 2; and FIGURE 6 is a detail of a portion of one of the comb strippers of FIGURE 5.

Before describing the drawings in detail it will make the understanding of them easier to briefly explain the nature of and operation of the machine as follows:

In the form shown herein the machine comprises a pair of revolvably mounted picking drums A and B studded with projecting soft, flexible, frictional, feather-engaging elements C. These drums are adjacent and extend laterally, preferably at a downward inclination, and the fowl to be picked are introduced at one end of and travel along to fall off of the opposite end of the drums all the while supported on and riding along upon the fast-moving picking elements carried by the drums.

The fowl are caused to turn and tumble in every direction by the action of the rotating picking elements and sometimes lifted bodily into the air and are guided to fall onto the picking drums by a wall or walls D, E extending along the drums. As the fowls are themselves twisting and turning about in every direction rapidly so as to open and extend their wings and legs, the action of the fast-rotating picking elements against their bodies, legs, wings, and neck reaches everywhere from comb to toes and is far different than the action of prior apparatus in common use wherein the "fingers" or beaters strike against a suspended fowl and where some parts of the fowl are necessarily shielded by the wings, legs, and other parts.

To prevent the fowls from being caught between or wound about the drums, either rotary strippers or fixed combs are provided and the relation of the speeds of the drums are preferably adjusted to eliminate such action. Such rotary strippers are designated F and G, and stationary comb strippers H, $H^1$ and $H^2$.

The machine may be made short to handle from one to three chickens at a time for removal when finished, or for a few seconds treatment and discharge into another similar machine for further treatment in succession, or the machine may be long enough and inclined sufficiently for the fowls to be passed in a constant stream of about one fowl per second or two to pass once through the machine and emerge completely finished, while another arrangement shown in the present drawings provides a medium length machine long enough to finish young chickens in one passage through, but provided with a gate J at the outlet end to hold the fowl all in the machine for a few seconds longer than normal and then open to let them fall out while a new lot of fowl are entering, and the gate closes to similarly hold back the new lot.

This latter arrangement is made to allow for continuous introduction of fowls to the machine at about one a second or two by the use of several gates J, spaced along the machine as at 24 in FIGURE 1, and which automatically open and close all together at short intervals, depending on the increased time desired for the particular fowls being treated. Such gates would seem to interfere with the fowl passing along but in practice do not do so as the fowl move away if the gates strike them. Some or all of the gates may be left open or removed in adjusting the desired length of treatment time.

In the drawings the showing is confined to the novel features, and conventional features such as any suitable transmission such as motors, belts, pulleys, gears, etc., which may be applied in many different ways to secure the rotation speeds, and directions of rotation indicated in the drawings, are generally omitted for clarity, but will be shown in additional drawings if wanted.

The drums A and B may be of any desired construction either of wood, sheet metal cylinders as in FIGURES 4 and 5, or skeleton construction as well understood in the art, and with the shafts supported in bearings (see FIGURE 1) carried by suitable supporting frame structure 4.

For the picking elements, while several of the conventional rubber picking "fingers" as heretofore used on fowl picking machines will operate to a certain degree on the present machine, and others which tend to wrap about the fowls too much will not, I have found the best results in carrying out the process involved is obtained with fingers made of flat strips or preferably individual loops C of flat strips of what is known as "crape" rubber as heretofore used for soling athletes' shoes, as I have discovered that the surface roughness of this particular material combined with its high coefficient of friction even when wet (not possessed by regular rubber) gives a remarkable efficiency in removing feathers with minimum skin injury yet possesses the strength and stiffness to support the fowls up in the air as they are being tumbled about and operated on, and reaches every spot on the fowl so that not even a pin feather nor a hair is to be found anywhere on the fowl when it emerges from the machine.

The picking elements C are preferably spaced a substantial distance apart in spaced rows around the drums A and B as indicated by the development view FIGURE 4 and operating between the circular rows of picking elements are the projections 17 of the stripper wheels or disks G or the "fingers" 18 of the rotary strippers F, and which strippers will free or "kick" out any parts of a fowl, such as a leg, wing, or neck which may get caught by the picking elements revolving toward the stripper.

In FIGURE 3 the strippers G are shown as comprising a disk 19 secured to a shaft 20 and with a channel-shaped rubber tire 21 sprung over the rim of the disk and with spaced projections 17 formed on its periphery. The upper strippers F may be the same as the lower ones G, but as they do very little work since they only aid gravity when a part of a fowl does not fall from drum A they may be simple fingers 18 of rubber or other material projecting from small hubs 22 secured to shaft 23. The drums and strippers are revolved in the directions indicated on the drawing.

In FIGURE 5 the machine is shown as with three picker drums K, L, M, which may all be the same size and constructed as set out for drums A and B or otherwise, here indicated as of sheet metal, secured to shafts 2, 3 and 20', respectively, all being revolved in the directions indicated on the drawing.

The strippers shown in this form of the machine may be like those shown and described under G and F for the machine of FIGURE 1, but are here shown as stationary combs H with tapered tines 27 positioned between the circular rows of picking elements with their tapered ends arranged tangentially adjacent to the drums as indicated in the drawings.

The gate or gates described in column 2 under designation J, which as stated may or may not be used, depending on the picking time required for particular fowl, are relatively small paddles preferably of fairly stiff rubber or rubber covered metal and which are spaced along the machine as indicated in FIGURE 1 at 24, and suitably mounted to move between the circular rows of picking elements into the space between drums A and B, or drums K and L to block the travel of the fowl therealong in going through the machine. These gates are mounted in any manner to slide in sheet metal slides or guides 24 fixed to the frame structure 4 or to swing on operating shaft 30 to move in and out by any source of power or connection to any moving part of the machine by suitable lever and link connections 25, 26, and any intermittent drive to yield a quick back and forth motion of the gates with a pause at the ends of the stroke may be used, and as indicated at P, driven by any variable speed motor reduction gear drive. The gates may also obviously be operated by hand, and any one or more may be removed or swung out of operative position if desired. One end gate only may be used as previously explained, but the use of several gates spaced along the machine overcomes any tendency for the fowl to crowd up toward the discharge end of the machine. Of course, the angle of inclination of the machine may be changed to slow down or hasten the movement of fowls through it, but the gates, together with a relative steep incline offer a better control.

In operation on chickens and with drum B about 24 inches diameter at outer end of picking element path, revolving about 200 r.p.m., and 11 inch O.D. strippers G 400 r.p.m. and drum A 250 r.p.m. the machine operates perfectly without the fowl becoming jammed. The requirement being that the strippers must be run fast enough to release any fowl tending to ride down around drum B and urge the fowl over to drum A which lifts the fowl into the path of B or to fall into the path of B if carried to stripper F. With large heavier fowl such as large turkeys the size of drums and speeds of rotation may have to be adjusted to maintain the above operation.

In the design of FIGURE 5 the third picking drum M aided by comb-stripper $H^2$ takes the place of strippers G of FIGURE 1 but an additional comb-stripper at H is desirable to release any fowl tending to go around drum M. The three drums of this variation may all rotate at the same speed of about 250 to 375 r.p.m. with drums about the same size as drum B of FIGURE 1.

It should be noted that in this machine the picking drum B of FIGURE 2, or picking drum L of FIGURE 5, does most of the work, and the other drum and strippers cooperate in keeping the fowls in proper relation to the picking drum.

Having thus described my new method of the mechanical defeathering of fowl and some variations in apparatus for practicing the method it is evident that many variations in the arrangement of the rolls or drums and associated parts may be made within the scope of the disclosure and spirit of the invention, and are intended to be covered in the accompanying claims.

Having thus described the invention what is claimed as new is:

1. The method of mechanically defeathering fowl which comprises frictionally striking loose free fowl with fast rotary moving soft flexible frictional defeathering elements, while confining the loose fowl in a manner to be supported upon said elements, and tumbling the fowl about in every direction while applying intermittent forces to oppose free travel of the fowl with said elements and aid in so tumbling the fowl about, to permit said elements to reach every feathered portion of the fowl including under and over the wings, the neck, and between the legs, until the feathers are substantially all removed.

2. The method of mechanically defeathering fowl which comprises frictionally striking loose free fowl with fast-moving soft flexible frictional defeathering elements at a speed and manner to tumble the fowl about rapidly in every direction to expose every part of the fowl to the action of said elements including under and over the wings, the neck, and between the legs, while supporting the fowl by and upon the frictional elements, yet opposing free travel of the fowl therewith, until the feathers are substantially all removed, while causing the fowl to move along a path transversely of the direction of the movement of said elements during the defeathering process, and out of the treatment when defeathered.

3. The method of mechanically defeathering fowl which comprises frictionally striking loose free fowl with fast rotary moving soft flexible defeathering elements at a speed and manner to tumble the fowl about rapidly in every direction to expose every part of the fowl to the action of said elements, including under and over the wings, the neck, and between the legs, while supporting the fowl upon said elements for so tumbling about while applying counterforces to the fowl to prevent the fowl from freely following the rotary path of said elements, until the feathers are substantially all removed, while causing the fowl to move along a path transversely of the direction of the movement of said elements during the defeathering process, and out of the same when finished.

4. The method of mechanically defeathering fowl which comprises frictionally striking loose free fowl with fast rotary moving soft flexible frictional defeathering elements at a speed and manner to tumble the fowl about in every direction to expose every part of the fowl to the action of said elements including under and over the wings, the neck, and between the legs, while supporting the fowl on said elements, and positively preventing the fowl from being dragged around bodily with said elements by continually combing the fowl free therefrom, until the feathers are substantially all removed from the fowl.

References Cited in the file of this patent

UNITED STATES PATENTS

| | | |
|---|---|---|
| 2,472,468 | Digby | June 7, 1949 |
| 2,754,539 | Toti | July 17, 1956 |